United States Patent

[11] 3,584,529

| [72] | Inventor | Donald J. Wallace<br>Denver, Colo. |
|---|---|---|
| [21] | Appl. No. | 731,427 |
| [22] | Filed | May 23, 1968 |
| [45] | Patented | June 15, 1971 |
| [73] | Assignee | Mission Corporation<br>Englewood, Colo. |

[54] HYDRAULIC SHEAR MACHINE
10 Claims, 8 Drawing Figs.

[52] U.S. Cl. .................................................. 83/457,
83/461, 83/580, 83/620, 83/639
[51] Int. Cl. .................................................. B26d 7/04,
B26d 5/12
[50] Field of Search .......................................... 83/618,
620, 639, 694, 457, 461, 635, 580, 452, 454, 451;
100/269

[56] References Cited
UNITED STATES PATENTS

| 610,584 | 9/1898 | Guild et al. | 83/461 |
| 1,389,878 | 6/1921 | Kraut | 83/620 |
| 3,066,566 | 12/1962 | Bottenhorn | 83/639 X |
| 3,289,514 | 12/1966 | Rupp | 83/461 X |
| 1,740,111 | 12/1929 | Olsen, Jr. et al. | 83/452 X |
| 1,808,244 | 6/1931 | McCullough | 100/269 UX |
| 3,000,295 | 9/1961 | Fenton | 100/269 X |

Primary Examiner—Andrew R. Juhasz
Assistant Examiner—James F. Coan
Attorney—John E. Reilly ABSTRACT: An apparatus for shearing workpieces such as metal sheets or bars of various shapes includes a reciprocating blade supported between opposing sides of an upright frame where the blade has one cutting edge at its upper end and another cutting edge in its body with cooperative interchangeable dies on frame for performing cuts on different shapes of workpieces. A clamp including a movable table member and opposing stationary member hold the workpiece for cutting by the upper edge of the blade, the clamp and blade being hydraulically actuated and fully coordinated in movement through each cutting operation.

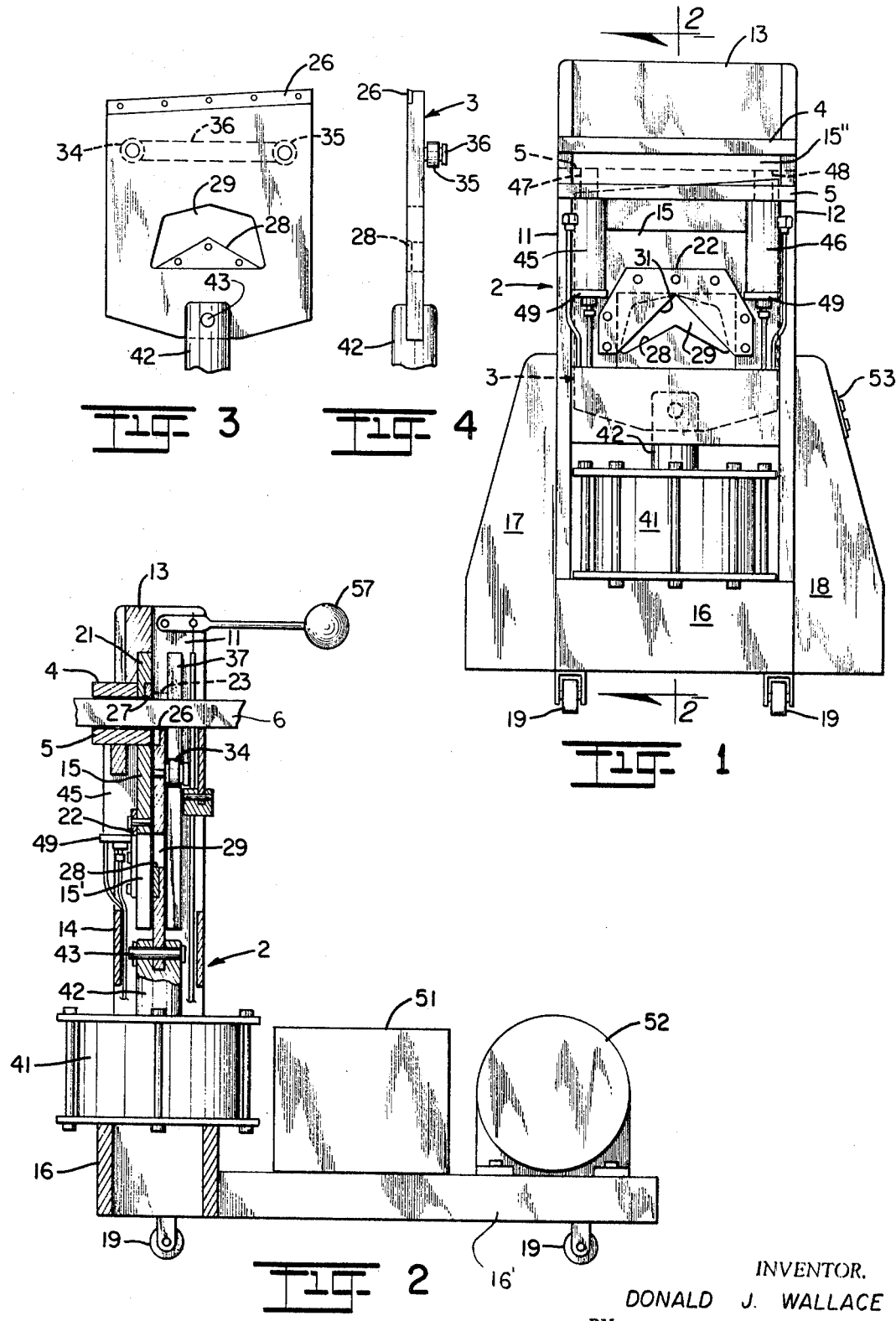

INVENTOR.
DONALD J. WALLACE
BY John E. Reilly
ATTORNEY

HYDRAULIC SHEAR MACHINE

This invention relates to shear apparatus and more particularly to a hydraulically powered machine for holding and cutting sheet and rod-type materials.

Present day small plant installations such as machine shops, fabricator plants and repair shops frequently require the rapid cutting of a variety of materials of special shapes. While some hydraulically powered shear machines have heretofore been provided for these applications they have not been entirely satisfactory and particularly have not been especially suited for meeting small plant requirements.

Accordingly, an object of this invention is to provide a simple, durable, economical and versatile shear machine capable of severing sheet or rod-type material of a wide variety of shapes.

Another object of this invention is to provide a hydraulically powered combined holding and shearing machine having positive upward displacement and downward retracting movement of its blade and clamping portions from hydraulic actuators located beneath the blade and clamp to drive them upwardly with selective regulation of the movement of either as required.

Still another object of this invention is to provide a portable, unitary combined holding and shear machine which may be readily moved to the location needed.

In accordance with this invention there is provided a shear machine including an upright mast arranged for guiding a blade in a reciprocal stroke by forces applied from a drive, preferably hydraulic, mounted on the machine below the blade to drive the blade upwardly. The blade has a pair of cutting edges disposed in spaced relation thereon with cooperative adjoining stationary blade edges in the form of interchangeable dies providing a pair of blade sets for cutting material of different types and shapes. A clamp holds the work in selected positions for one blade set and has one jaw driven upwardly preferably by a hydraulic drive. The drives are coordinated for conjoint or independent actuation by control systems, a low-pressure system employing an accumulator to actuate the clamp independently of the motor and a booster in blade drive line to increase the pressure on the clamp.

Other object, advantages and features of the present invention will become apparent as the description proceeds taken in conjunction with the accompanying drawings, in which:

FIG. 1 is a front end elevation view of a portable shear machine embodying features of the present invention;

FIG. 2 is a sectional view taken along line 2–2 of FIG. 1 with a substantial portion of the ram shown in full;

FIG. 3 is a front elevational view of the blade of the machine shown in FIG. 1;

FIG. 4 is an end elevation view of the blade shown in FIG. 3;

Figure 5:
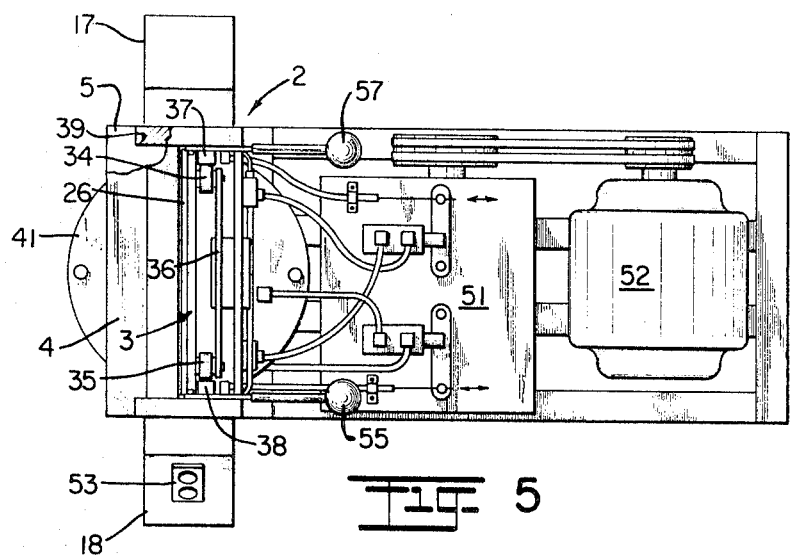
FIG. 5 is a top plan view of the shear machine shown in FIG. 1 with a portion of the stationary member of the clamp broken away to show one notched portion of the lower table member.

Referring now particularly to FIGS. 1 to 6 of the drawing, the shear machine shown, in general, includes an upright support frame or mast 2, a movable blade 3 arranged for guided reciprocal movement on the frame to perform a cutting function, a vise or clamp assembly including an upper stationary member 4, and a lower oppositely disposed movable table member 5 adjacent the upper edge of the blade holds a workpiece, represented at 6 in FIG. 2, in position for cutting by the blade 3. The table member 5 and blade 3 are selectively moved by an operator in an upward vertical direction preferably by separate hydraulic drives regulated by a hydraulic control system hereafter described more fully with reference to FIGS. 7 and 8.

For the purpose of illustration, the term "workpiece" as used herein refers to a variety of stock, commonly metal materials of different sizes and shapes, such as, steel plate, angle iron, rebar, channel iron, round or square stock and the like which are to be cut or severed to some specified length. While metal is the usual kind of material to be handled it is understood that the present invention is also applicable to other materials capable of being severed in a shearing operation.

Frame or mast 2 is preferably formed as an integral member, such as, by casting and is shown to comprise oppositely disposed upright left and right side portions 11 and 12 when viewed from the front in FIG. 1, an overhead portion 13, an intermediate cross portion 14, a central die support portion 15 and base portion 16.

The central portion 15 is generally of an inverted U-shape providing a central aperture 15' in the frame which aligns with the aperture of the blade and an upper aperture 15'' between the central portion 15 and the overhead portion 13. Left and right side outrigger portions 17 and 18 extend laterally and outwardly of the side portions, and a rearward extension 16' of the base portion 16 serves as a base support or bed for the hydraulic control system to be hereinafter described. For some applications where added mobility is desired, the base portion 16 may be provided with wheels or casters 19.

Figure 6:
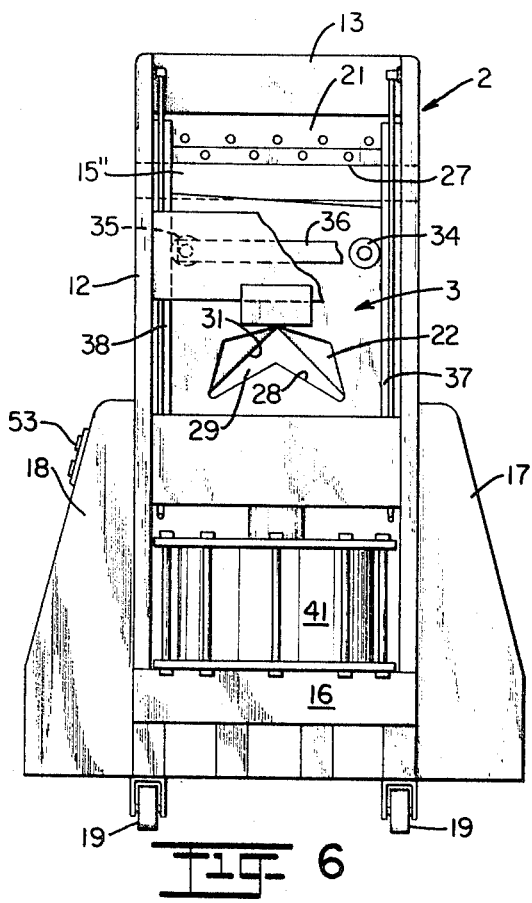
FIG. 6 is a rear end elevation view of the shear apparatus shown in FIG. 1 with a portion of the frame and spacer bar broken away to show interior parts.

Shearing or cutting of a workpiece is performed in either of two locations on the assembly by means of the movable blade 3 which forms with an upper stationary blade 21 an upper blade set and forms with a lower stationary blade 22 between opposite ends of the movable blade a lower blade set. The stationary blades 21 and 22 are secured to the frame forwardly of the movable blade 3 in a plane parallel with, and having adjoining surfaces in close proximity to, the movable blade. Blade 3 is shown in FIGS. 1, 2 and 6 in a retracted or return position wherein the cutting edges of the respective blades are spaced apart and apertures 15' and 15'' will receive a piece of material to be sheared. Blade 3 is moved in a cutting stroke to an upper extended position depicted in dash lines 23 in FIG. 2 by a drive ram hereafter described.

The movable blade 3 is in the form of a flat body having a cutting edge 26 at the upper end which is inclined along its width and also preferably is beveled slightly to decline toward the rear. The inclination along the width provides a gradual even cut on the workpiece. The cooperative cutting edge 27 of the upper stationary blade 21 is straight across its width and preferably is beveled slightly to decline toward the front as shown in FIG. 2. Each of these cutting edges is preferably formed of a piece of hard material such as tool steel which is detachably mounted as by bolts or screws on an associated blade body to permit removal or sharpening replacement.

Another cutting edge 28 is preferably provided on a V-shaped die detachably mounted on the body of the movable blade 3 along the lower edge surface of an aperture 29, the cutting edge 28 herein shown to be of generally inverted, V-shaped configuration. Blade 22 is defined by an inverted V-shaped die having a cutting edge 31 and is detachably mounted on the central portion 15 of the frame by a bolt fastening and the like. The shape of this die and aperture 29 may be varied to perform cuts on workpieces of a different section shaping. The die blade aperture shape and die shape shown is a universal blade configuration for use with pieces of a variety of cross section shapes.

The movable blade 3 is supported and guided in its travel between the frame side portions 11 and 12 by a pair of spaced rollers 34 and 35 mounted on a rear surface thereof and are held in spaced relation to one another by a spacer bar 36. Each roller is journaled on a pin so as to fully slide along guideways or tracks 37 and 38 projecting inwardly from the inner surfaces of the side portions of the frame, as shown in FIG. 5.

The stationary member 4 of the clamp or vise assembly, which may also be characterized as an upper jaw, is supported from and preferably formed as an integral part of the overhead frame portion 13 in forwardly disposed relation to the stationary blade 21. Member 4 is generally oblong in section and has a generally horizontal flat or planar undersurface of a substantial area and is disposed in the same generally horizontal plane as the cutting edge of the upper stationary blade 21 throughout its lengthwise extent.

The movable table member or lower jaw 5 of the clamp is disposed below and in opposing relation to the stationary member 4 and between the opposing frame side portions 11 and 12. As shown in FIG. 5, each end of the table member 5 includes a notched portion 39 which slidably fits in the forward inside corners of the frame side portions 11 and 12 in order to guide table member 5 in its vertical reciprocal movement. Table member 5 has an upper portion disposed forwardly of the movable blade and in its lower retracted position show seats on the upper surface of the central portion 15, the upper portion being generally oblong in section and having a generally horizontal flat or planar top surface. The top surface is parallel with the undersurface of the stationary jaw member 4 and has sufficient area to function as a support or table for a workpiece.

In the preferred form in order to drive the movable blade through each cutting stroke, a hydraulic ram piston and double-acting cylinder assembly 41 is disposed below the movable blade, the cylinder being mounted on the base portion 16 between the side portions 11 and 12; and a piston rod 42 is arranged for extension upwardly from the cylinder. The rod 42 is provided with a slot in its upper end for insertion of the bottom extremity of the blade 3 and detachable connection thereto by a transverse pin 43. In a manner to be described, the ram piston is reciprocated to drive the blade through a predetermined working and return stroke. In turn, the movable table member 5 is controlled in movement by a pair of spaced hydraulic cylinders 45 and 46 disposed in an upright manner and secured to the frame under the table member with piston rods 47 and 48 extending downwardly. Each of the cylinders rests on an outwardly projecting ledge portion 49 on the mast, the cylinders being urged upwardly against opposite ends of the table member 5 to cause the workpiece to be clampingly engaged between the stationary and movable table members 4 and 5. These cylinders are preferably single-acting, spring-biased units, as represented in FIGS. 7 and 8 so as to return the table member 5 to the lower retracted position when hydraulic pressure to the cylinder is removed.

Figure 7:
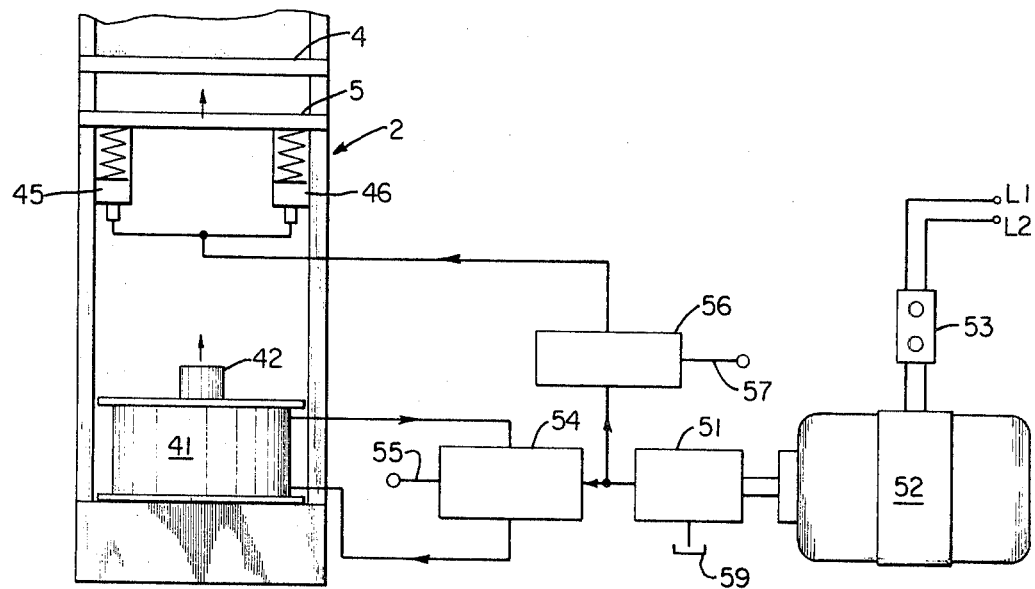
FIG. 7 is a schematic diagram of a high-pressure hydraulic control system for the machine shown in FIG. 1.
Figure 8:
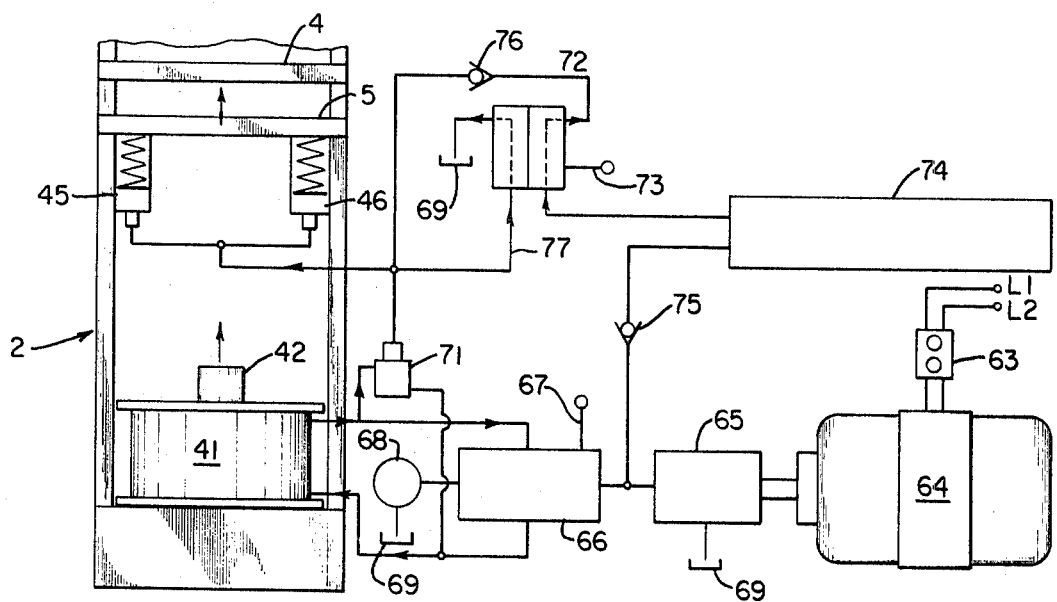
FIG. 8 is a schematic diagram of a low-pressure hydraulic control system for the machine of FIG. 1.

Control systems suitable for selectively regulating the above-described drive in a coordinated movement are herein referred to as the high-pressure system depicted schematically in FIG. 7 and the low-pressure system depicted schematically in FIG. 8. Referring first to the high-pressure system of FIG. 7 there is shown a preferred power source including a pump 51 driven by an electric motor 52. The electric power to the electric motor designated L1 and L2 which may be a standard electric 115-volt outlet is turned on and off to start and stop the motor by an electric on/off switch 53 connected in the lines therebetween. The fluid flow from the pump to the ram is regulated preferably by a four-way, closed center valve 54 coupled by suitable flow lines between the output of the pump and inputs to the ram, the valve 54 being controlled by manual operating lever 55. The fluid flow from the pump 51 to the hydraulic cylinders 45 and 46 is regulated by a valve 56 coupled by suitable flow lines between the output of the pump and the inputs of both cylinders in a parallel line connection to apply an equal pressure to each. Valve 56 is preferably a three-way valve, has manual actuator lever 57 and the pump exhausts to a return tank 59. In a sequence of operation for the high-pressure system of FIG. 7 the motor 52 must first be started for both clamp and blade actuation. Then a workpiece may be inserted in the upper aperture 15″ between blade edges 26 and 27 and clamped in place by operating lever 57 which moves jaw 5 upwardly by driving cylinders 45 and 46. Lever 55 is then operated and the plunger 42 moves blade upwardly to shear the workpiece. If a workpiece has been inserted in aperture 15′ rather than 15″ then this same upward movement of the blade in operation of lever 57 provides a shearing action between blade edges 22 and 28.

With reference to the portable assembly depicted in FIGS. 1 to 6 the motor 52 and pump 51 are shown mounted on the rearward extension 16′ of the base portion 16, the electric switch 53 is mounted on outrigger portion 18 for easy access, the clamp lever 57 is pivotally mounted on the inner side of the left side portion 11 and the blade lever 55 on the right side portion 12 with suitable linkage and with suitable control lines shown passing from each lever to the associated valve.

In the low-pressure system shown in FIG. 8 there is provided an electric switch 63 between the power lines L1 and L2 and an electric drive motor 64 to start and stop the motor and the motor is in driving relation to a pump 65. In this low-pressure arrangement the horsepower rating and the pump capacity requirements are substantially less than in the high-pressure arrangement of FIG. 7. A typical comparison would be a three or five horsepower motor for drive 64 as compared to a five or 7½ electric motor for drive 52. A typical working fluid pressure for the low-pressure system is about 1,500 p.s.i. and the high-pressure system is about 3,000 p.s.i. A valve 66 is connected between the output of the pump and input of the ram 41 which may be either a solenoid actuated or manually controlled four-way closed center valve. The valve 66 in this system is shown to be operated by a lever 67 and is normally closed so that fluid circulates through a filter 68 coupled to a valve into the return tank 69. A booster 71 is connected to the output of the valve 66. A control valve 72 for the hydraulic cylinders 45 and 46 is preferably a two-way valve having two inputs and two outputs, and the valve 72 is operated by lever 73. An accumulator or fluid energy storage member 74 and a check valve 75 to restrict backflow are coupled by suitable flow lines between the output of the pump 65 and one input of the valve 72. A check valve 76 for the valve 72 is disposed in the flow line between one output of valve 72 and the input of the hydraulic cylinders 45 and 46. A return flow line 77 from these cylinders 45 and 46 passes fluid to the other input of the valve 72 to the tank 69 through the other output. One setting of the lever 73 will then pass fluid from the cylinder through valve 72 and to the tank 69. The output of the booster 61 is coupled to the input of each of the cylinders 45 and 46.

With the low-pressure arrangement the accumulator 74 stores energy during rotation of the motor 64. The table member 5 thus may be actuated to clamp a workpiece in position for cutting before the motor 64 is started. In one form booster 71 has an enlarged piston on the intake side and a small piston on the output side and increases the pressure on the cylinders on the order of four times to provide substantial holding pressure for the clamp, thus requiring a substantially less output pressure from the pump to provide adequate holding pressure for the clamp.

In a general sequence of operation for the low-pressure system of FIG. 8 the workpiece may be clamped into position prior to starting of the motor 64 by operating lever 73. Here the accumulator 61 applies stored pressure to the table cylinders sufficient to work the clamp independently of the rest of the system. After the workpiece is clamped in position the right side lever 67 is manually moved and pressure applied to the ram to drive blade 3 upwardly and sever the clamped workpiece. If a workpiece has been positioned in the lower aperture 29 then it will be sheared by the lower blade set of blade edges designated 28 and 31.

In the low-pressure system of FIG. 8 the workpieces are secured in the clamp under substantial holding pressure because of booster 71. Valve 66 in the form of FIG. 8 is normally closed so that fluid circulates through filter 68 to the tank 69. The spring-loaded cylinders 45 and 46 will return blade 3 to the retracted position after valve lever 73 has been moved to an "off" position. The table member 5 may be lowered gradually by engaging the lever 73 and allowing the fluid from the cylinders to return to the tank 69. Although not shown, a microswitch can be used with a solenoid valve in cooperation with the four-way valve shown in FIG. 8 to cycle the ram back and fourth automatically.

In addition to simply holding workpieces for cutting, the clamp or vise may be also used as a small press to bend twisted parts. The hydraulic system above described affords a slow upward movement of the table member and blade with the application of a substantial, and uniform, force to carry out the holding and cutting functions while the workpieces are fully visible. The changeable dies particularly for the lower blade set affords a wide range of different cuts which may be varied by simply removing and replacing the die.

Although the present invention has been described with a certain degree of particularity, it is understood that the present disclosure has been made only by way of example and that various modifications and changes may be resorted to in the preferred and alternate forms described and illustrated herein without departing from the spirit and scope thereof.

What I claim is:

1. A portable shear apparatus for metal pieces and the like comprising an upright frame including oppositely disposed side portions, an overhead portion and a wheel-mounted base portion, cutting means supported from said frame including a movable blade having a first cutting edge at an upper end and another cutting edge formed along a surface of an aperture in its body and a stationary blade cutting edge disposed in a plane parallel to each said movable blade, each stationary blade having a cutting edge in opposing and facing relation to associated of each said movable blade edges to provide an opening therebetween when the movable blade is disposed in a retracted lower position, means for guiding said movable blade for reciprocal movement between said side portions inclusive of a pair of opposing rollers supported from the movable blade and oppositely disposed guide pieces on said side portions, a clamp including a stationary member supported from the overhead portion and a movable table member arranged for reciprocal movement between said side portions for holding the workpiece in position between said movable blade and its associated stationary blade, first hydraulic drive means for advancing said movable table member upwardly, second hydraulic drive means on the frame below said movable blade for advancing said movable blade upwardly to an extended position past the associated stationary blade edges for shearing a workpiece disposed in either of said openings, and control means for said drive means operative to successively actuate the clamp and the movable blade for successively clamping and shearing each workpiece.

2. Shear apparatus for workpieces comprising a mast, a cutting assembly supported from the mast including a movable blade supported for reciprocal movement between opposing sides of said mast and a stationary blade disposed in a plane parallel to each said movable blade, said blades having cutting edges disposed in opposing relation to provide an opening therebetween when the movable blade is disposed in a lower retracted position, clamp means supported on said mast including a stationary surface and an oppositely disposed movable surface supported for reciprocal movement between said sides of said mast for holding a workpiece in position between said blades, hydraulic cylinder means for advancing said movable surface upwardly to clamp a workpiece in position, hydraulic ram means advancing said blade upwardly to an extended position for shearing the clamped workpiece, a motor driven pump arranged for delivering fluid under pressure to said cylinder means and said ram means for actuating same, and a control system including a first manual valve means coupled between the output of said pump and the input of said cylinder means and a second manual valve means coupled between the output of said pump and the input of said ram means for selectively and independently controlling the upward movement of said clamp and blade, said control system including hydraulic booster means coupled between the pump and ram means and the input of said cylinder means to increase the pressure applied to said clamp.

3. Shear apparatus for workpieces comprising a mast, a cutting assembly supported from the mast including a movable blade supported for reciprocal movement between opposing sides of said mast and a stationary blade disposed in a plane parallel to said movable blade, each said blade having first and second associated cutting edges each disposed in opposing facing relation to one another to provide aligned openings therebetween when the movable blade is disposed in a lower retracted position, clamp means supported on said mast including a stationary surface and an oppositely disposed movable surface supported for reciprocal movement between said sides of said mast for holding a workpiece in position between said first associated cutting edges, hydraulic cylinder means disposed below the clamp for advancing said movable surface vertically upwardly to clamp a workpiece in position, hydraulic ram means disposed below the blade advancing said blade vertically upwardly to an extended position for shearing the clamped workpiece, a motor driven pump arranged for delivering fluid under pressure to said cylinder means and said ram means for actuating same, and a control system including a first manual valve means coupled between the output of said pump and the input of said cylinder means and a second manual valve means coupled between the output of said pump and the input of said ram means for selectively and independently controlling the upward movement of said clamp and blade, whereby the blade is movable independently of said clamp means for shearing a workpiece in the aligned opening between the second associated cutting edges.

4. Shear apparatus as set forth in claim 3 wherein said first movable cutting edge is inclined along the width and beveled along the thickness of the movable blade.

5. Shear apparatus as set forth in claim 3 wherein said second cutting edge is essentially of an inverted V-shaped configuration.

6. Shear apparatus as set forth in claim 3 wherein said stationary blade associated with said second cutting edge is an interchangeable die shaped to accommodate a workpiece of a preselected section.

7. Shear apparatus as set forth in claim 3, wherein said clamp movable member is returned to the lower retracted position by a spring bias means.

8. Shear apparatus as set forth in claim 3, wherein the movable clamp member is essentially planar and of substantial width along its upper surface for supporting a workpiece.

9. Shear apparatus as set forth in claim 3 wherein said clamp drive means for the clamp movable member is defined by a pair of simultaneously actuated spaced hydraulic cylinders arranged below the movable member for engaging an undersurface portion of the movable clamp member.

10. Shear apparatus as set forth in claim 3 wherein said control system includes hydraulic storage means coupled between the output of said pump and said first manual valve means to provide pressure to said first valve means to advance said cylinder means independently of the operation of said motor driven pump.